United States Patent
Schulman

(10) Patent No.: US 9,647,846 B1
(45) Date of Patent: May 9, 2017

(54) SYSTEMS AND METHODS FOR VERIFYING THE AUTHENTICITY OF GRAPHICAL IMAGES

(71) Applicant: Symantec Corporation, Mountain View, CA (US)

(72) Inventor: Martin Schulman, Herndon, VA (US)

(73) Assignee: Symantec Corporation, Mountain View, CA (US)

( * ) Notice: Subject to any disclaimer, the term of this patent is extended or adjusted under 35 U.S.C. 154(b) by 17 days.

(21) Appl. No.: 14/788,641

(22) Filed: Jun. 30, 2015

(51) Int. Cl.
*H04L 29/06* (2006.01)
*H04L 9/32* (2006.01)
*G06F 21/56* (2013.01)

(52) U.S. Cl.
CPC ............ *H04L 9/3247* (2013.01); *G06F 21/56* (2013.01); *G06F 2221/034* (2013.01)

(58) Field of Classification Search
CPC ............................... H04L 9/3247; G06F 21/56
USPC .......................................................... 713/176
See application file for complete search history.

(56) References Cited

U.S. PATENT DOCUMENTS

| | | | | |
|---|---|---|---|---|
| 6,889,324 B1 * | 5/2005 | Kanai | ................... | H04L 9/3263 380/246 |
| 7,809,297 B2 * | 10/2010 | Moroi | ................... | G06F 21/629 399/80 |
| 2001/0010729 A1 * | 8/2001 | Kamijoh | ............... | G06T 1/0057 382/100 |
| 2002/0012445 A1 * | 1/2002 | Perry | ..................... | G06Q 10/00 382/100 |
| 2002/0064759 A1 * | 5/2002 | Durbin | ..................... | A61C 9/00 433/213 |
| 2004/0017926 A1 * | 1/2004 | Tonisson | ............... | G06T 1/0028 382/100 |
| 2004/0052400 A1 * | 3/2004 | Inomata | ................ | G06T 1/0028 382/100 |
| 2004/0153649 A1 * | 8/2004 | Rhoads | ................. | G06F 17/241 713/176 |
| 2005/0125407 A1 * | 6/2005 | Kraus | ................... | G06F 21/575 |
| 2005/0169496 A1 * | 8/2005 | Perry | ..................... | G06F 21/10 382/100 |
| 2006/0119891 A1 * | 6/2006 | Shimizu | ................ | G06F 21/608 358/1.15 |
| 2007/0071279 A1 * | 3/2007 | Yamamoto | ......... | H04N 1/32165 382/100 |
| 2008/0127340 A1 * | 5/2008 | Lee | ......................... | H04L 51/12 726/22 |
| 2009/0010570 A1 * | 1/2009 | Yamada | ............. | G06K 9/00221 382/312 |
| 2009/0328143 A1 * | 12/2009 | Ming | .................... | G06T 1/0028 726/2 |

* cited by examiner

*Primary Examiner* — Michael S McNally
(74) *Attorney, Agent, or Firm* — FisherBroyles LLP

(57) ABSTRACT

The disclosed computer-implemented method for verifying the authenticity of graphical images may include (1) identifying a graphical image intended for presentation by a display and then, prior to facilitating presentation of the graphical image by the display, (2) identifying an original unique identifier of at least a portion of the graphical image encoded into the graphical image, (3) computing a subsequent unique identifier of the portion of the graphical image, and (4) determining, by comparing the subsequent unique identifier to the original unique identifier, whether the graphical image is authentic. Various other methods, systems, and computer-readable media are also disclosed.

20 Claims, 7 Drawing Sheets

SYSTEMS AND METHODS FOR VERIFYING THE AUTHENTICITY OF GRAPHICAL IMAGES

BACKGROUND

Computing devices often display graphical images for viewing by users. For example, a computing device may receive graphical image data from a banking server in connection with a financial transaction involving a user. Upon receiving the graphical image data, the computing device may display the graphical image data so that the user is able to approve and/or complete the financial transaction. As another example, a computing device may obtain graphical image data that represents a mugshot of a convicted felon from an online criminal database. Upon obtaining the graphical image data, the computing device may display the graphical image data so that a user is able to view the mugshot of the convicted felon.

Unfortunately, users who view such graphical images displayed by their computing devices may have little, if any, assurance that the graphical images being displayed are authentic and/or legitimate. Referring back to the financial-transaction situation introduced above, the user may have little, if any, assurance that the graphical image displayed by the user's device is the same graphical image sent by the banking server to the user's device. For example, in the event that the user's device is infected with malware that manipulates the graphical image prior to being displayed, the user may be wholly unaware that the displayed graphical image does not accurately represent (or is not true to) the actual financial transaction. As a result, the user may approve the financial transaction represented by the manipulated graphical image, thereby potentially initiating the actual financial transaction (e.g., transferring funds from the user's bank account to the malware author's offshore account).

In addition, referring back to the mugshot situation introduced above, the user may have little, if any, assurance that the mugshot displayed by the user's device is the actual mugshot of the convicted felon rather than a photograph of a different person. For example, in the event that the online criminal database has been compromised by malware or unauthorized access that led to the mugshot being manipulated, the user may be wholly unaware that the displayed photograph does not accurately represent (or is not true to) the mugshot of convicted felon. As a result, the user may be misled to believe that the person shown in the photograph is the convicted felon, thereby spoofing the user.

The instant disclosure, therefore, identifies and addresses a need for additional and improved systems and methods for verifying the authenticity of graphical images.

SUMMARY

As will be described in greater detail below, the instant disclosure describes various systems and methods for verifying the authenticity of graphical images by encoding signed identifiers (such as hashes) into the graphical images.

In one example, a computer-implemented method for verifying the authenticity of graphical images may include (1) identifying a graphical image intended for presentation by a display and then, prior to facilitating presentation of the graphical image by the display, (2) identifying an original unique identifier of at least a portion of the graphical image encoded into the graphical image, (3) computing a subsequent unique identifier of the portion of the graphical image, and (4) determining, by comparing the subsequent unique identifier to the original unique identifier, whether the graphical image is authentic.

In one example, the method may also include identifying the graphical image at a source device that generated the graphical image. In this example, the method may further include computing, at the source device, the original unique identifier of the portion of the graphical image. Additionally or alternatively, the method may include modifying the graphical image by encoding the original unique identifier into the graphical image.

In one example, the graphical image may include and/or represent a photographic image captured by a camera associated with the source device. In another example, the graphical image may include and/or represent a computer-generated image created by the source device.

In some examples, the method may also include cryptographically signing, at the source device, the original unique identifier with a private key. In one example, the method may further include encoding, at the source device, a signed version of the original unique identifier as a set of pixels included in the graphical image. In another example, the method may further include steganographically encoding, at the source device, a signed version of the original unique identifier into a set of least significant bits of pixels included in the graphical image. Additionally or alternatively, the method may include decrypting the original unique identifier with a public key that corresponds to the private key.

In one example, the method may also include determining that the graphical image is authentic. In this example, the method may further include enabling the display to present the graphical image in response to determining that the graphical image is authentic by delivering the graphical image to the display for presentation.

In one example, the method may also include determining that the graphical image is inauthentic. In this example, the method may further include preventing the display from presenting the graphical image in response to determining that the graphical image is inauthentic by refusing to deliver the graphical image to the display. Additionally or alternatively, the method may include determining that a user device associated with the display is infected with malware based at least in part on the determination that the graphical image is inauthentic.

In one example, the method may also include identifying the malware on the user device. Additionally or alternatively, the method may include notifying the user device of the malware. Similarly, the method may further include notifying security software that monitors the user device of the malware.

In one example, the original and subsequent unique identifiers may each include and/or represent a hash or a fingerprint. Additionally or alternatively, the identifying, computing, and/or determining features may be performed by a graphics-mediation device that resides between a user device and the display and mediates graphical images delivered for presentation by the display.

In one example, a system for implementing the above-described method may include (1) an identification module, stored in memory, that (A) identifies a graphical image intended for presentation by a display and (B) identifies an original unique identifier of at least a portion of the graphical image encoded into the graphical image, (2) a computation module, stored in memory, that computes a subsequent unique identifier of the portion of the graphical image, (3) an authentication module, stored in memory, that determines, by comparing the subsequent unique identifier to the original unique identifier, whether the graphical image is authentic before the display presents the graphical image, and (4) at least one physical processor configured to execute the identification module, the computation module, and the authentication module.

In another example, the above-described method may be encoded as computer-readable instructions on a non-transitory computer-readable medium. For example, a computer-readable medium may include one or more computer-executable instructions that, when executed by at least one processor of a computing device, cause the computing device to (1) identify a graphical image intended for presentation by a display and then, prior to facilitating presentation of the graphical image by the display, (2) identify an original unique identifier of at least a portion of the graphical image encoded into the graphical image, (3) compute a subsequent unique identifier of the portion of the graphical image, and (4) determine, by comparing the subsequent unique identifier to the original unique identifier, whether the graphical image is authentic.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
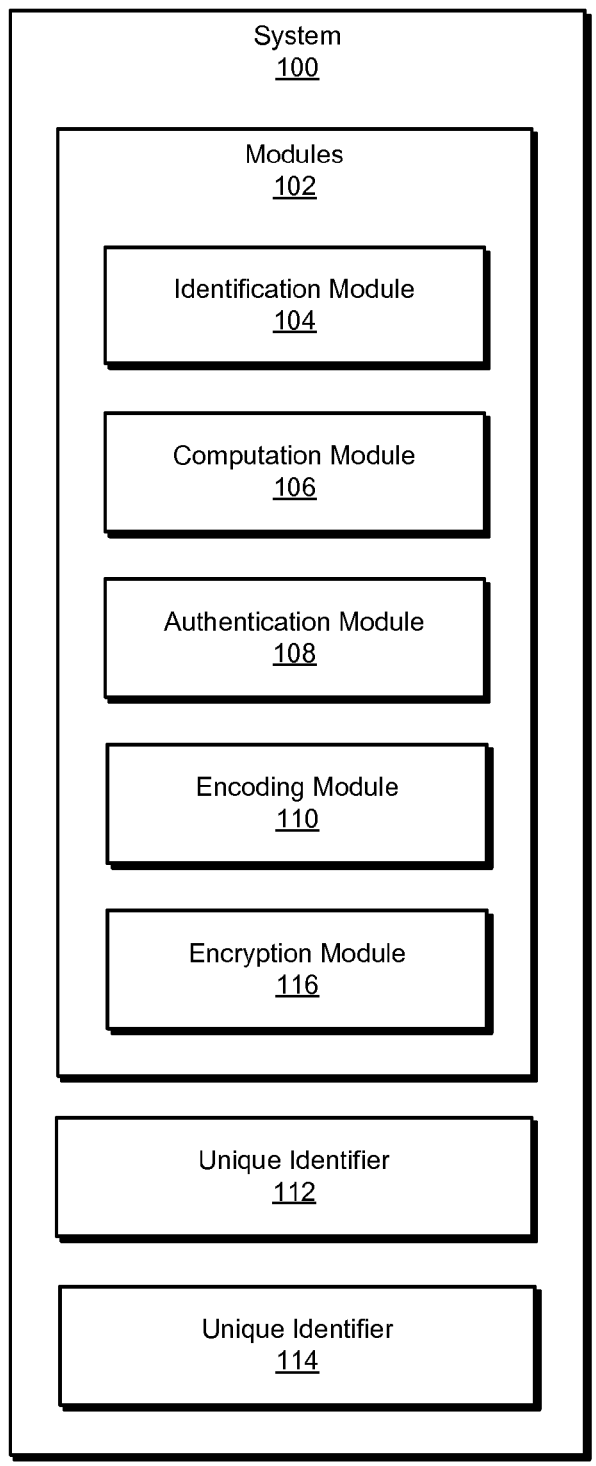
FIG. 1 is a block diagram of an exemplary system for verifying the authenticity of graphical images.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for verifying the authenticity of graphical images. As will be explained in greater detail below, by encoding signed identifiers into graphical images, the various systems and methods described herein may be able to verify the authenticity of the graphical images prior to displaying the same for viewing by a user. Moreover, by verifying the authenticity of graphical images prior to displaying the same for viewing by a user, the various systems and methods described herein may give the user peace of mind in knowing that the displayed graphical images accurately represent (or are true to) the situation expected by the user. For example, in the context of a financial transaction, these systems and methods may enable the user to be confident that the graphical images presented on the user's display accurately represent the actual financial transaction as understood by the user.

Additionally or alternatively, by encoding signed identifiers into graphical images, the various systems and methods described herein may be able to determine that the graphical images delivered for display to a user have been manipulated and/or adulterated in an attempt to spoof the user. By determining that the graphical images have been manipulated and/or adulterated in such a way, the various system and methods described herein may prevent those graphical images from being displayed to the user, thereby undermining the attempted spoof. Moreover, in the event that the graphical images have been manipulated and/or adulterated in such a way, the various system and methods described herein may be able to use this information to determine that the user's device that obtained and/or delivered the graphical images for display to the user is infected with malware. In this example, the malware may include and/or represent a bot that manipulates and/or adulterates graphical images involved in financial transactions for the benefit of the bot's creator and/or controller.

Figure 2:
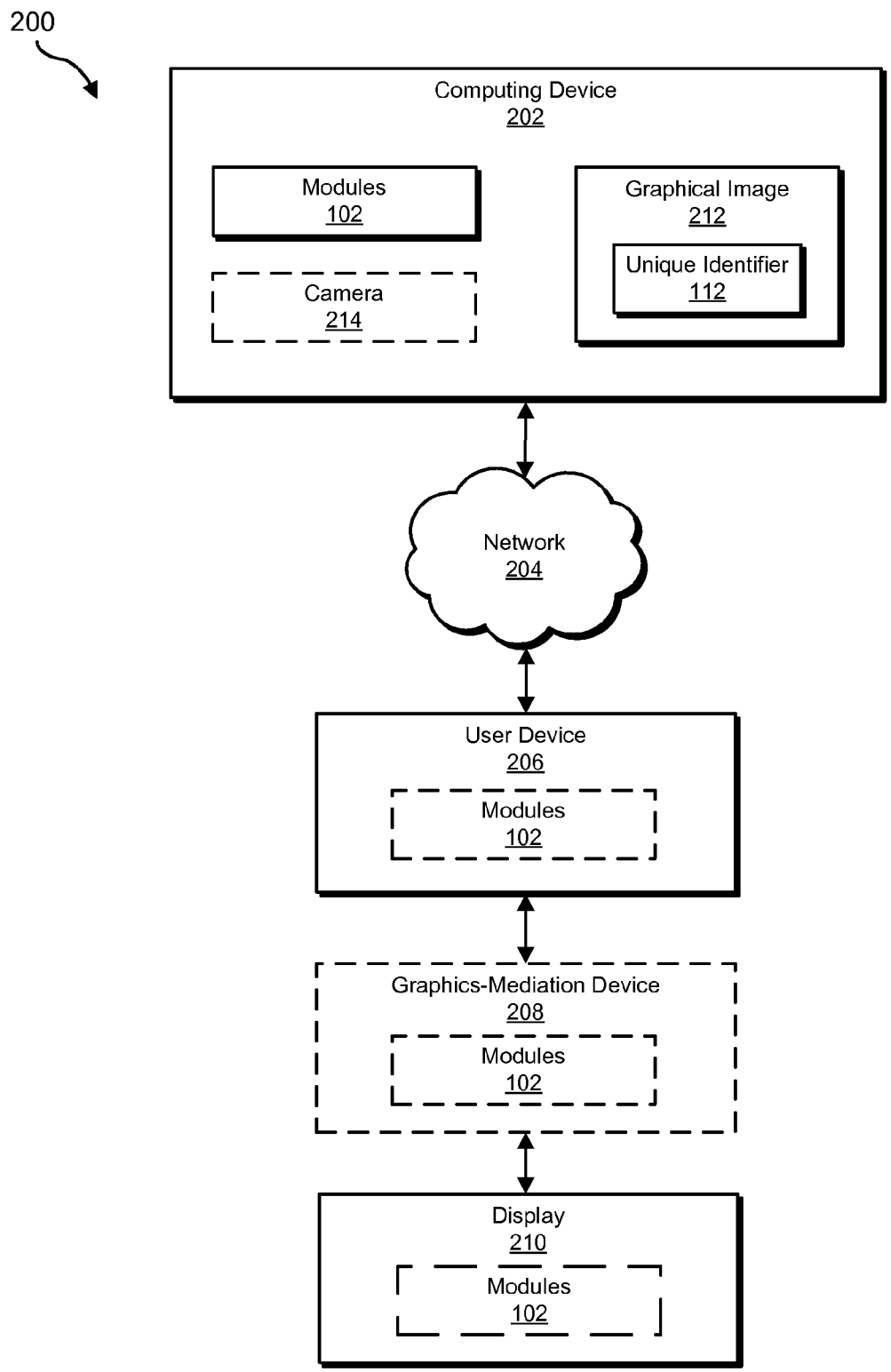
FIG. 2 is a block diagram of an additional exemplary system for verifying the authenticity of graphical images.

The following will provide, with reference to FIGS. 1 and 2, detailed descriptions of exemplary systems for verifying the authenticity of graphical images. Detailed descriptions of corresponding computer-implemented methods will be provided in connection with FIG. 3. Detailed descriptions of encoding processes will be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for verifying the authenticity of graphical images. As illustrated in this figure, exemplary system 100 may include one or more modules 102 for performing one or more tasks. For example, and as will be explained in greater detail below, exemplary system 100 may include an identification module 104 that identifies a graphical image intended for presentation by a display and identifies an original unique identifier of at least a portion of the graphical image encoded into the graphical image. Exemplary system 100 may also include a computation module 106 that computes a subsequent unique identifier of the portion of the graphical image.

In addition, and as will be described in greater detail below, exemplary system 100 may include an authentication module 108 that determines, by comparing the subsequent unique identifier to the original unique identifier, whether the graphical image is authentic before the display presents the graphical image. Exemplary system 100 may also include an encoding module 110 that encodes a signed version of the original unique identifier as a set of pixels included in the graphical image or into a set of least significant bits of pixels included in the graphical image.

Exemplary system 100 may further include an encryption module 116 that encrypts, signs, and/or decrypts the original unique identifier with a private key and/or a corresponding public key. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, user device 206, graphics-mediation device 208, and/or display 210), computing system 610 in FIG. 6, and/or portions of exemplary network architecture 700 in FIG. 7. One or more of modules 102 in FIG. 1 may also represent all or portions of one or more special-purpose computers (e.g., graphics-mediation device 208 in FIG. 2) configured to perform one or more tasks.

As illustrated in FIG. 1, exemplary system 100 may also include unique identifiers 112 and 114. The term "unique identifier," as used herein in connection with a graphical image, generally refers to any type or form of identifier and/or representation that uniquely identifies and/or represents at least a portion of the graphical image. In some examples, unique identifiers 112 and 114 may be used to verify and/or discredit the authenticity of a graphical image. In one example, unique identifier 112 may be created by a source device that generates and/or captures the graphical image and then encoded into the graphical image.

In contrast, unique identifier 114 may be created by a graphics-mediation device that (1) resides between a user device and a display and (2) mediates graphical images delivered for presentation by the display. Additionally or alternatively, unique identifier 114 may be created by the user device itself or the display itself. Examples of unique identifiers 112 and 114 include, without limitation, hashes, fingerprints, checksums, MD5 checksums, secure hash algorithms, digital signatures, references, variations of one or more of the same, combinations of one or more of the same, or any other suitable unique identifiers.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a user device 206 via a network 204. In some examples, computing device 202 may be programmed with one or more of modules 102. In one example, computing device 202 may include and/or be associated with a camera 214.

In some examples, computing device 202 may generate, capture, obtain, and/or receive a graphical image 212. For example, computing device 202 may capture graphical image 212 using camera 214. In this example, computing device 202 may compute unique identifier 112 of an original version of graphical image 212 and then encode unique identifier 112 into graphical image 212. Accordingly, computing device 202 may constitute and/or represent the source of graphical image 212.

In some examples, user device 206 may be programmed with one or more of modules 102. In such examples, user device 206 may access, obtain, and/or receive graphical image 212 from computing device 202 via network 204. In one example, user device 206 may (1) identify unique identifier 112 encoded into graphical image 212, (2) compute unique identifier 114 of at least a portion of graphical image 212, and then (3) determine, by comparing unique identifier 114 to unique identifier 112, whether graphical image 212 is authentic.

As illustrated in FIG. 2, system 200 may alternatively include a graphics-mediation device 208 that sits and/or resides between user device 206 and a display 210. In some examples, graphics-mediation device 208 may be programmed with one or more of modules 102. In such examples, graphics-mediation device 208 may access, obtain, and/or receive graphical image 212 from computing device 202 via network 204. In one example, graphics-mediation device 208 may (1) identify unique identifier 112 encoded into graphical image 212, (2) compute unique identifier 114 of at least a portion of graphical image 212, and then (3) determine, by comparing unique identifier 114 to unique identifier 112, whether graphical image 212 is authentic.

Additionally or alternatively, display 210 may be programmed with one or more of modules 102. In such examples, display 210 may access, obtain, and/or receive graphical image 212 directly from user device 206. In one example, display 210 may (1) identify unique identifier 112 encoded into graphical image 212, (2) compute unique identifier 114 of at least a portion of graphical image 212, and then (3) determine, by comparing unique identifier 114 to unique identifier 112, whether graphical image 212 is authentic.

In one embodiment, one or more of modules 102 from FIG. 1 may, when executed by at least one processor of computing device 202, user device 206, graphics-mediation device 208, and/or display 210, enable the corresponding device to verify and/or discredit the authenticity of graphical images. For example, and as will be described in greater detail below, one or more of modules 102 may cause graphics-mediation device 208 to (1) identify graphical image 212 intended for presentation by display 210 and then, prior to facilitating presentation of graphical image 212 by display 210, (2) identify original unique identifier 112 of at least a portion of graphical image 212 encoded into graphical image, (3) compute a subsequent unique identifier 114 of the portion of graphical image 212, and (4) determine, by comparing subsequent unique identifier 114 to original unique identifier 112, whether graphical image 212 is authentic.

Computing device 202 generally represents any type or form of computing device capable of reading computer-executable instructions. Examples of computing device 202 include, without limitation, laptops, tablets, desktops, servers, mobile devices, cellular phones, camera devices, Personal Digital Assistants (PDAs), multimedia players, embedded systems, Field Programmable Gate Arrays (FPGAs), wearable devices (e.g., smart watches, smart glasses, etc.), gaming consoles, variations of one or more of the same, combinations of one or more of the same, exemplary computing system 610 in FIG. 6, or any other suitable computing device.

User device 206 generally represents any type or form of computing device capable of reading computer-executable instructions. Examples of user device 206 include, without limitation, laptops, tablets, desktops, servers, mobile devices, cellular phones, PDAs, multimedia players, embedded systems, FPGAs, wearable devices, gaming consoles, variations of one or more of the same, combinations of one or more of the same, exemplary computing system 610 in FIG. 6, or any other suitable user device.

Graphics-mediation device 208 generally represents any type or form of computing device capable of mediating graphical images delivered by a user device for presentation on a display. In one example, graphics-mediation device 208 may include and/or represent an FPGA-based system that sits and/or resides between user device 206 and display 210. Additionally or alternatively, graphics-mediation device 208 may be incorporated into user device 206 or display 210. Graphics-mediation device 208 may need to verify the authenticity of all graphical images prior to facilitating presentation of those graphical images on display 210. Although graphics-mediation device 208 is illustrated in FIG. 2, certain implementations and/or variations of system 200 may exclude graphics-mediation device 208. Such implementations and/or variations of system 200 may enable user device 206 and/or display 210 to perform some or all of the tasks and/or features described herein in connection with graphics-mediation device 208.

Display 210 generally represents any type or form of computer-related user interface, display, monitor, and/or screen capable of presenting and/or displaying graphical images. In one example, display 210 may be configured to present and/or display graphical images as directed by user device 206. In this example, display 210 may include and/or represent a stand-alone unit or be incorporated into user device 206. Display 210 may present and/or display only graphical images whose authenticity has already been verified.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and user device 206.

Graphical image 212 generally represents any type or form of computer-presentable graphical image, interpretation, and/or representation. In one example, graphical image 212 may include and/or represent a photographic image. In another example, graphical image 212 may include and/or represent a video and/or a frame in a video feed. In a further example, graphical image 212 may include and/or represent a computer-generated image. Examples of graphical image 212 include, without limitation, photographs, videos, video frames, Joint Photographic Experts Group (JPEG) images, Tagged Image File Format (TIFF) images, Graphics Interchange Format (GIF) images, bitmaps, Portable Network Graphics (PNG) images, HyperText Markup Language (HTML) images, webpages, text, forms, variations of one or more of the same, combinations of one or more of the same, or any other graphical image.

Figure 3:
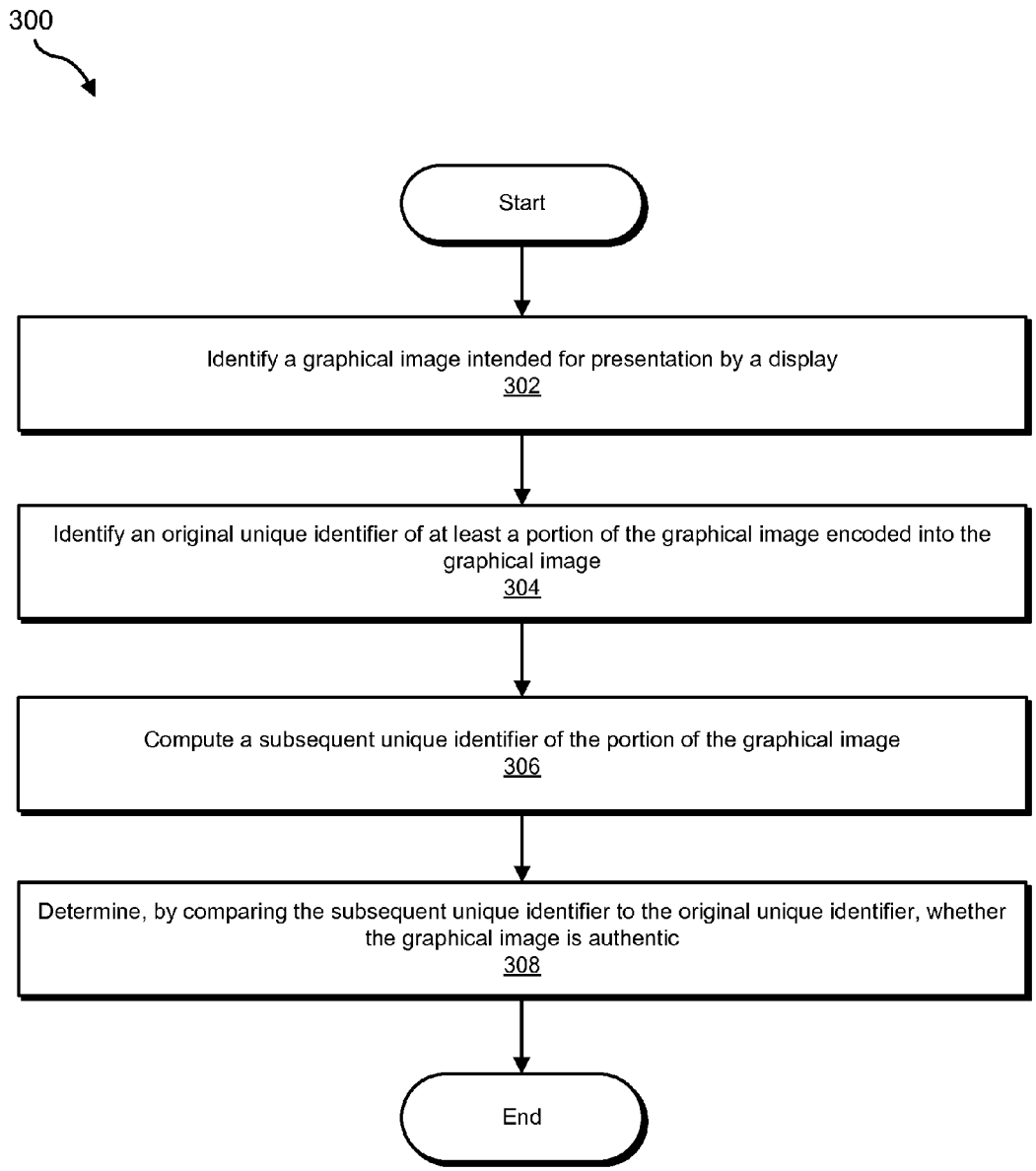
FIG. 3 is a flow diagram of an exemplary method for verifying the authenticity of graphical images.

FIG. 3 is a flow diagram of an exemplary computer-implemented method 300 for verifying the authenticity of graphical images. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a graphical image intended for presentation by a display. For example, identification module 104 may, as part of user device 206, graphics-mediation device 208, and/or display 210 in FIG. 2, identify graphical image 212 intended for presentation by display 210. In this example, identification module 104 may perform this identification after user device 206 obtains, receives, and/or accesses graphical image 212 but before display 210 actually presents graphical image 212 for display to the user.

The systems described herein may perform step 302 in a variety of ways and/or contexts. In some examples, identification module 104 may identify graphical image 212 as user device 206 initiates delivery of graphical image 212 to display 210 for presentation. For example, user device 206 may submit graphical image 212 for presentation by display 210. In one example, all graphical images submitted for presentation by display 210 may pass to one or more of modules 102 (whether on user device 206, graphics-mediation device 208, or display 210) for inspection and/or verification prior to being displayed to the user. In this example, identification module 104 may identify graphical image 212 as user device 206 submits graphical image 212 for presentation by display 210.

In a specific example, all graphical images submitted for presentation by display 210 may pass to graphics-mediation device 208 on their way to display 210. For example, graphics-mediation device 208 may sit and/or reside between user device 206 and display 210. In this example, user device 206 and graphics-mediation device 208 may be configured to communicate with one another in only one direction. This one-way communication may enable user device 206 to send only graphical image data to graphics-mediation device 208 and prevent graphics-mediation device 208 from sending any communications to user device 206. By maintaining this type of one-way communication, graphics-mediation device 208 may achieve a high level of security that protects against and/or thwarts attacks from remote devices (not necessarily illustrated in FIG. 2) over network 204.

Continuing with the above example, user device 206 may submit graphical image 212 to graphics-mediation device 208 on the way to display 210. In this example, as graphical image 212 arrives at graphics-mediation device 208, identification module 104 may identify graphical image 212.

Returning to FIG. 3, at step 304 one or more of the systems described herein may identify an original unique identifier of at least a portion of the graphical image encoded into the graphical image. For example, identification module 104 may, as part of user device 206, graphics-mediation device 208, and/or display 210 in FIG. 2, identify original unique identifier 112 encoded into graphical image 212. In one example, original unique identifier 112 may include and/or represent a hash and/or fingerprint of an original version of graphical image 212.

The systems described herein may perform step 304 in a variety of ways and/or contexts. In some examples, identification module 104 may identify original unique identifier 112 encoded into graphical image 212 by searching a certain portion of graphical image 212 for such an identifier. For example, identification module 104 may scan a row of pixels along the top or bottom edge of graphical image 212 for a pixel-encoded identifier. Additionally or alternatively, identification module 104 may scan a column of pixels along the left or right edge of graphical image 212 for a pixel-encoded identifier. In any case, identification module 104 may identify original unique identifier 112 while scanning the pixels of graphical image 212 in this way.

In another example, identification module 104 may scan the Least Significant Bits (LSBs) of certain pixels included in graphical image 212 for a steganographically encoded identifier. For example, identification module 104 may scan a series of 24-bit or 48-bit Red Green Blue (RGB) pixels within graphical image 212 for a steganographically encoded identifier within such RGB pixels. In this example, original unique identifier 112 may be steganographically encoded into various RGB pixels within graphical image 212 by way of their LSBs. Accordingly, identification module 104 may identify original unique identifier 112 while scanning the LSBs of the RGB pixels within graphical image 212 in this way.

The term "steganography" and the phrase "steganographically encoding," as used herein in connection with a unique identifier, generally refer to any encoding practice and/or procedure that involves hiding and/or concealing the unique identifier within a graphical image. In one example, a steganographically encoded unique identifier may be effectively invisible to the human eye. Accordingly, the user may be unable to detect any variation between an original graphical image and a modified version of the graphical image that includes a steganographically encoded unique identifier.

Original unique identifier 112 may be encoded into graphical image 212 in a variety of ways. In some examples, one or more of the systems described herein may identify the graphical image on the source device that generated the graphical image. For example, identification module 104 may, as part of computing device 202 in FIG. 2, identify graphical image 212. In this example, computing device 202 may represent the source that generated graphical image 212 (e.g., using camera 214). Additionally or alternatively, computing device 202 may have accessed, obtained, and/or received graphical image 212 from another computing device (not illustrated in FIG. 2).

In some examples, one or more of the systems described herein may compute, at the source device, the original unique identifier of the portion of the graphical image. For example, computation module 106 may, as part of computing device 202 in FIG. 2, compute original unique identifier 112 of the portion of graphical image 212. In this example, computation module 106 may compute original unique identifier 112 from an original version of graphical image 212. Computation module 106 may subject the original version of graphical image 212 to any type or form of hash and/or fingerprinting function or algorithm. By subjecting the original version of graphical image 212 to such a function or algorithm, computation module 106 may be able to produce original unique identifier 112.

In some examples, one or more of the systems described herein may cryptographically sign, at the source device, the original unique identifier with a private key. For example, encryption module 116 may, as part of computing device 202 in FIG. 2, cryptographically sign original unique identifier 112 with a private key. Additionally or alternatively, encryption module 116 may encrypt original unique identifier 112 with the private key.

In some examples, one or more of the systems described herein may modify the graphical image by encoding the original unique identifier into the graphical image. For example, encoding module 110 may, as part of computing device 202 in FIG. 2, modify graphical image 212 by encoding original unique identifier 112 into graphical image 212. In one example, encoding module 110 may encode a signed version of original unique identifier 112 as a set of pixels included in graphical image 212. This set of pixels may include and/or form any combination of colors, shapes, and/or pixel pitch to facilitate encoding the signed version of original unique identifier 112 within graphical image 212.

Figure 4:
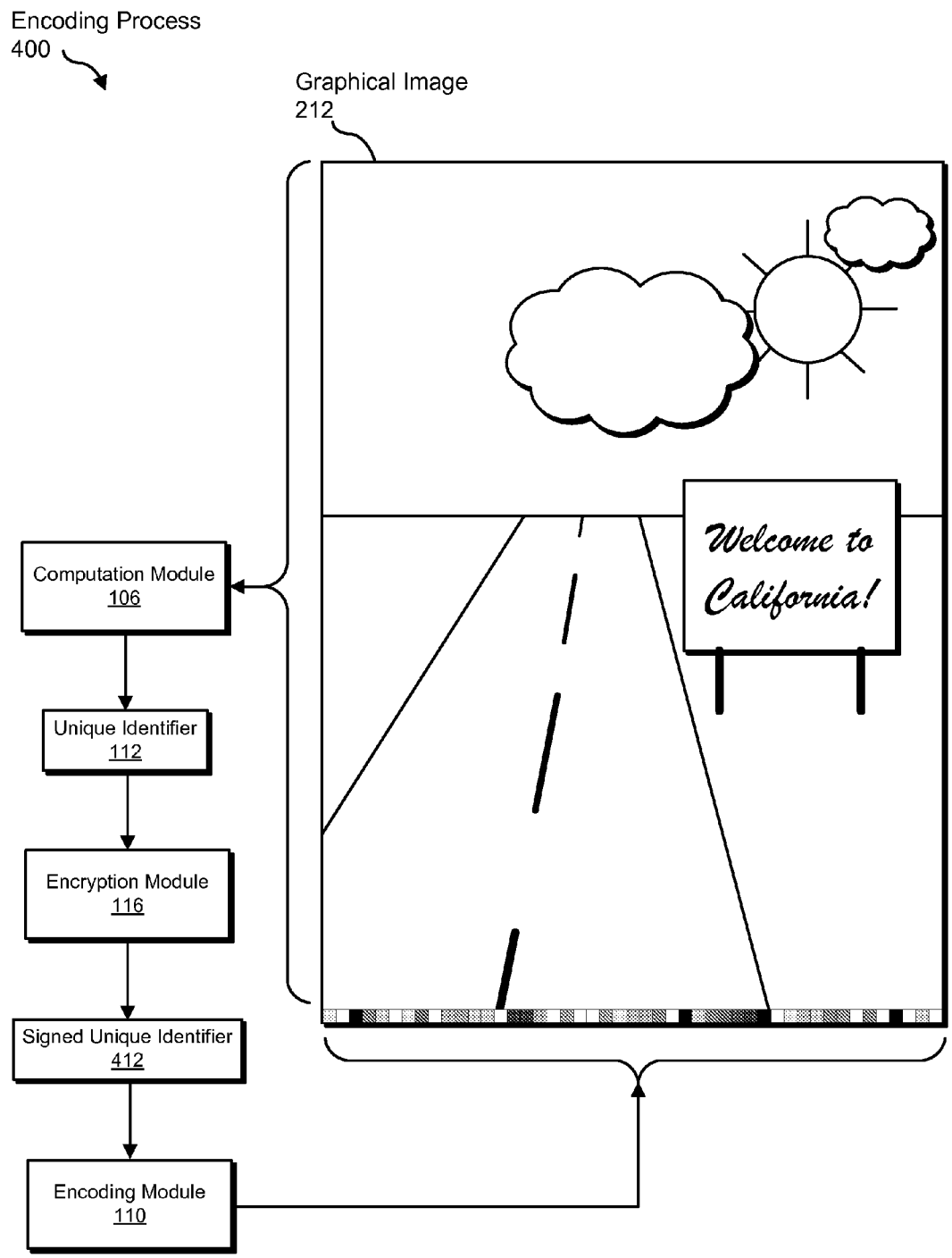
FIG. 4 is a block diagram of an exemplary process for encoding a signed unique identifier as a set of pixels within a graphical image.

As a specific example, one or more of modules 102 may direct and/or cause computing device 202 to perform and/or facilitate encoding process 400 in FIG. 4 on graphical image 212. As illustrated in FIG. 4, computation module 106 may compute original unique identifier 112 of a portion of the original version of graphical image 212. This portion of the original version of graphical image 212 may include and/or represent all pixels within the original version of graphical image 212 except for certain pixels arranged along the bottom edge of the original version of graphical image 212. Upon computation of original unique identifier 112, encryption module 116 may encrypt and/or sign original unique identifier 112, thereby forming a signed unique identifier 412 in FIG. 4. Encoding module 110 may then encode signed unique identifier 412 into graphical image 212 as a row of pixels arranged along the bottom edge of graphical image 212. This row of pixels representing signed unique identifier 412 along the bottom edge of graphical image 212 may effectively replace, within graphical image 212, the pixels that were excluded from the computation of unique identifier 112.

Additionally or alternatively, encoding module 110 may steganographically encode a signed version of original unique identifier 112 into a set of LSBs of pixels included in graphical image 212. For example, encoding module 110 may increment and/or decrement (or set and/or clear) the LSBs of certain pixels included in graphical image 212 to steganographically encode a signed version of original unique identifier 112 into graphical image 212. By modifying only the LSBs of such pixels, encoding module 110 may be able to encode this signed version of original unique identifier 112 into graphical image 212 without introducing enough variation that the user would be able to detect the modification with the naked eye.

Figure 5:
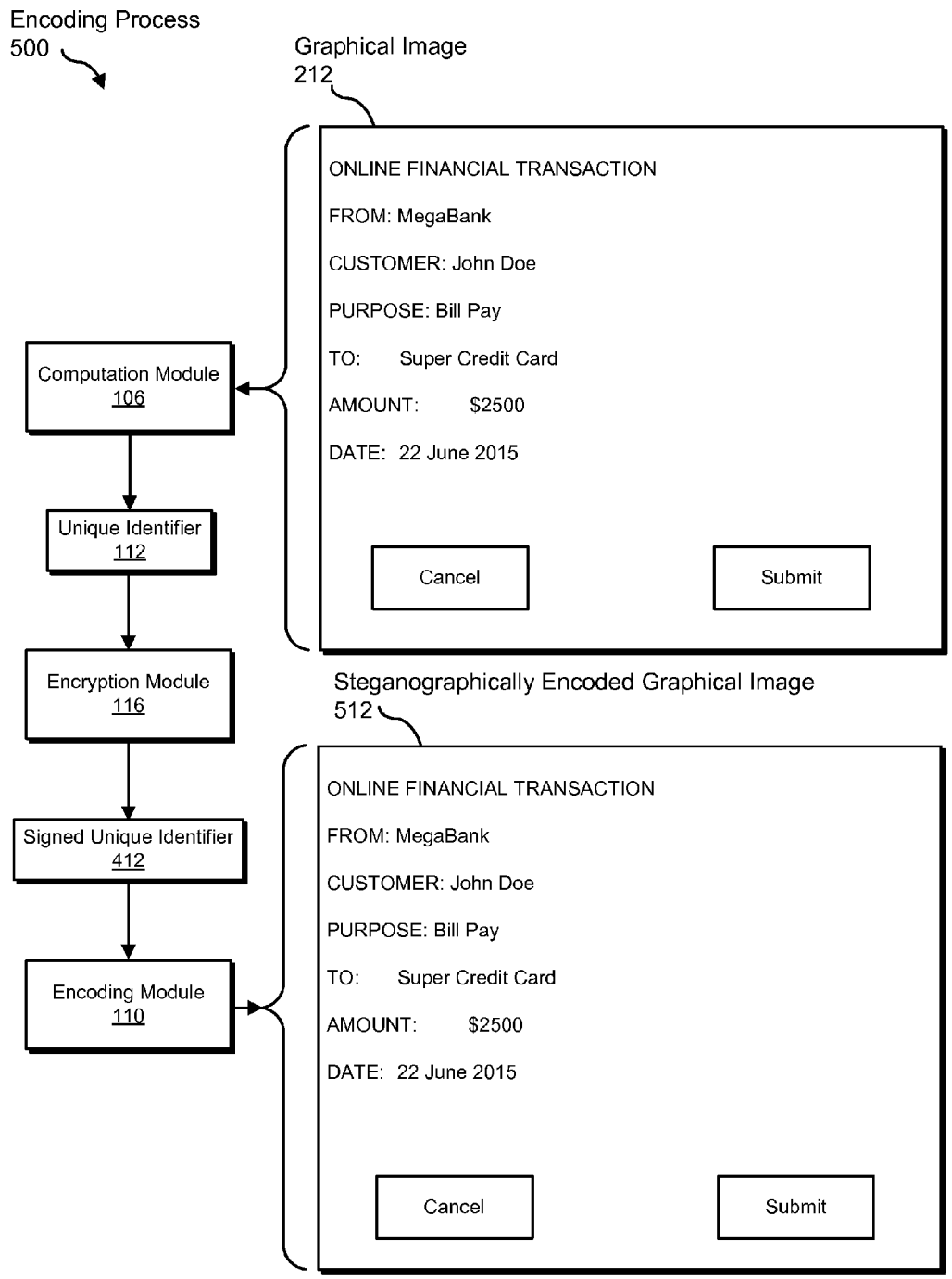
FIG. 5 is a block diagram of an exemplary process for encoding a signed unique identifier into a set of least significant bits of pixels within a graphical image.

As a specific example, one or more of modules 102 may direct and/or cause computing device 202 to perform and/or facilitate encoding process 500 in FIG. 5 on graphical image 212. As illustrated in FIG. 5, computation module 106 may compute original unique identifier 112 of an original version of graphical image 212. In one example, computation module 106 may compute original unique identifier 112 from all pixel bits, except for the LSBs, included in some or all of the pixels within graphical image 212. For example, in the event that graphical image 212 includes 24-bit RGB pixels, computation module 106 may compute original unique identifier 112 from 23 of the 24 bits included in all 24-bit RGB pixels within graphical image 212, thereby excluding the LSBs of those RGB pixels from the computation. As another example, in the event that graphical image 212 includes 48-bit RGB pixels, computation module 106 may compute original unique identifier 112 from 47 of the 48 bits included in select 48-bit RGB pixels within graphical image 212, thereby excluding the LSBs of those select RGB pixels from the computation.

Upon computation of original unique identifier 112, encryption module 116 may encrypt and/or sign original unique identifier 112, thereby forming a signed unique identifier 412 in FIG. 5. Encoding module 110 may then steganographically encode signed unique identifier 412 into graphical image 212 by incrementing and/or decrementing (or setting and/or clearing) the LSBs of various pixels included in graphical image 212. For example, encoding module 110 may encode original unique identifier 112 into the LSBs of all pixels included in graphical image 212. As another example, encoding module 110 may encode original unique identifier 112 into the LSBs of only the select pixels (or a subset of the select pixels) from which original unique identifier 112 was computed. Despite the modification to the LSBs of these pixels, the user may be unable to detect the modification with the naked eye since LSBs have very little effect on the appearance of such pixels. In some examples, computing device 202 may send graphical image 212 to user device 206 via network 204. Additionally or alternatively, user device 206 may access and/or obtain graphical image 212 from computing device 202 via network 204.

Before display 210 is able to present graphical image 212 to the user, authentication module 108 may need to verify the authenticity of graphical image 212. For example, identification module 104 may, as part of user device 206, graphics-mediation device 208, and/or display 210 in FIG. 2, identify the encoded version of original unique identifier 112 within graphical image 212. Encoding module 110 may then, as part of user device 206, graphics-mediation device 208, and/or display 210 in FIG. 2, decode the encoded version of original unique identifier 112 identified within graphical image 212. Upon completion of this decoding, encryption module 116 may, as part of user device 206, graphics-mediation device 208, and/or display 210 in FIG. 2, decrypt original unique identifier 112 with a public key that corresponds to the private key used to encrypt original unique identifier 112.

Returning to FIG. 3, at step 306 one or more of the systems described herein may compute a subsequent unique identifier of the portion of the graphical image. For example, computation module 106 may, as part of user device 206, graphics-mediation device 208, and/or display 210 in FIG. 2, compute subsequent unique identifier 114 (not illustrated in FIG. 2) of the portion of graphical image 212. In one example, subsequent unique identifier 114 may include and/or represent a hash and/or fingerprint of graphical image 212 that arrived at user device 206 via network 204.

The systems described herein may perform step 306 in a variety of ways and/or contexts. In some examples, computation module 106 may compute subsequent unique identifier 114 from the portion of graphical image 212 that corresponds to the original version of graphical image 212. For example, computation module 106 may compute subsequent unique identifier 114 from the photographic portion of graphical image 212 in FIG. 4. In this example, computation module 106 may subject the photographic portion of graphical image 212 in FIG. 4 to the same hash and/or fingerprinting function or algorithm used to produce original unique identifier 112 in FIG. 4. By subjecting the photographic portion of graphical image 212 in FIG. 4 to that function or algorithm, computation module 106 may be able to produce subsequent unique identifier 114.

Additionally or alternatively, computation module 106 may compute subsequent unique identifier 114 from steganographically encoded graphical image 512 in FIG. 5. In some examples, computation module 106 may compute subsequent unique identifier 114 from the same set of pixels used to compute original unique identifier 112. For example, in the event that graphical image 512 includes 24-bit RGB pixels, computation module 106 may compute subsequent unique identifier 114 from 23 of the 24 bits included in all 24-bit RGB pixels within graphical image 512, thereby excluding the LSBs of those RGB pixels from the computation. As another example, in the event that graphical image 512 includes 48-bit RGB pixels, computation module 106 may compute subsequent unique identifier 114 from 47 of the 48 bits included in select 48-bit RGB pixels within graphical image 512, thereby excluding the LSBs of those select RGB pixels from the computation.

In the event that the graphical image that arrived at user device 206 has not been modified and/or adulterated in any way since the encoding at computing device 202, original unique identifier 112 and/or subsequent unique identifier 114 may be effectively identical to one another. However, in the event that the graphical image that arrived at user device 206 has been modified and/or adulterated in some way since the encoding at computing device 202, original unique identifier 112 and/or subsequent unique identifier 114 may differ from one another.

Returning to FIG. 3, at step 308 one or more of the systems described herein may determine whether the graphical image is authentic by comparing the subsequent unique identifier to the original unique identifier. For example, authentication module 108 may, as part of user device 206, graphics-mediation device 208, and/or display 210 in FIG. 2, determine whether graphical image 212 is authentic by comparing subsequent unique identifier 114 to original unique identifier 112. In another example, authentication module 108 may determine whether steganographically encoded graphical image 512 is authentic by comparing subsequent unique identifier 114 to original unique identifier 112. The term "authentic" or "authenticity," as used herein in connection with a graphical image, generally refers to the state and/or condition in which the graphical image remains unmodified and/or unadulterated since the encoding of an original unique identifier into the graphical image.

The systems described herein may perform step 308 in a variety of ways and/or contexts. In some examples, authentication module 108 may determine that graphical image 212 or steganographically encoded graphical image 512 is authentic in the event that the comparison reveals that subsequent unique identifier 114 and original unique identifier 112 are effectively identical to one another. In response to determining that graphical image 212 or steganographically encoded graphical image 512 is authentic, authentication module 108 may enable display 210 to present the graphical image by delivering the graphical image to display 210 for presentation.

In some examples, authentication module 108 may determine that graphical image 212 or steganographically encoded graphical image 512 is inauthentic in the event that the comparison reveals that subsequent unique identifier 114 and original unique identifier 112 differ from one another. In response to determining that graphical image 212 or steganographically encoded graphical image 512 is inauthentic, authentication module 108 may prevent display 210 from presenting the graphical image by refusing to deliver graphical image 212 to display 210. Additionally or alternatively, authentication module 108 may determine that user device 206 is infected with malware the graphical image is inauthentic. In other words, authentication module 108 may determine that malware infecting user device 206 is responsible for modifying and/or adulterating the graphical image, which ultimately led to the discrepancy between subsequent unique identifier 114 and original unique identifier 112.

As a result, authentication module 108 may notify security software that monitors and/or protects user device 206 of the malware. Additionally or alternatively, authentication module 108 and/or the security software may identify the malware on user device 206 and/or notify user device 206 of the malware.

Unfortunately, even heavily protected computing systems may be susceptible to attack. For example, air-gapped systems may contract malware through hardware and/or software that has been compromised at the time of design, manufacture, and/or distribution. In this example, the malware may alter and/or replace certain files, graphical images, and/or videos accessed and/or downloaded by those systems. As a result, users of those systems may be unable to fully trust the files, graphical images, and/or videos presented on their displays.

In an effort to address the risk posed by such malware, a user may implement and/or incorporate an External Inline Video Verification (EIVV) device that sits and/or resides between a computing system and the computing system's display. In one example, the EIVV device may remain offline to decrease the EIVV device's susceptibility to attack. In this example, the EIVV device may receive only graphical image and/or video data from the computing system without any need or ability to send communications back to the computing system. The EIVV device may need to verify the authenticity of all graphical image and/or video data prior to forwarding the same to the computing system's display.

As a specific example, a server may generate a graphical image and/or video. In this example, the server may compute a hash over the graphical image and/or video and then cryptographically sign the hash with a private key. Upon cryptographically signing the hash, the server may encode the hash as a small strip of pixels into the graphical image and/or video. For example, the server may encode the hash into the graphical image and/or video by replacing certain pixels that were excluded from the hash's computation with a small strip of pixels that represent the signed hash. The server may then send the graphical image and/or video to the computing system for presentation by the computing system's display.

As the computing system receives the graphical image and/or video from the server, an application running on the computing system may render the graphical image and/or video to the display buffer and/or output the signal to the EIVV device. In one example, the EIVV device may include a defined area of the display screen for validating all graphical image and/or video data. When the user drags the graphical image and/or video into that defined area, the EIVV device may identify the edges of the graphical image and/or video and then re-compute a hash over the original pixels used to compute the hash encoded into the graphical image and/or video. In addition, the EIVV device may decode and/or decrypt the hash encoded into the graphical image and/or video.

In the event that the re-computed hash matches the decoded and/or decrypted hash, the EIVV device may determine that the graphical image and/or video is authentic. As a result, the EIVV device may forward the graphical image and/or video to the computing device's display for presentation to the user. However, in the event that the re-computed hash does not match the decoded and/or decrypted hash, the EIVV device may determine that the graphical image and/or video is not authentic. As a result, the EIVV device may drop the graphical image and/or video such that the computing device's display never presents the graphical image and/or video to the user.

Figure 6:
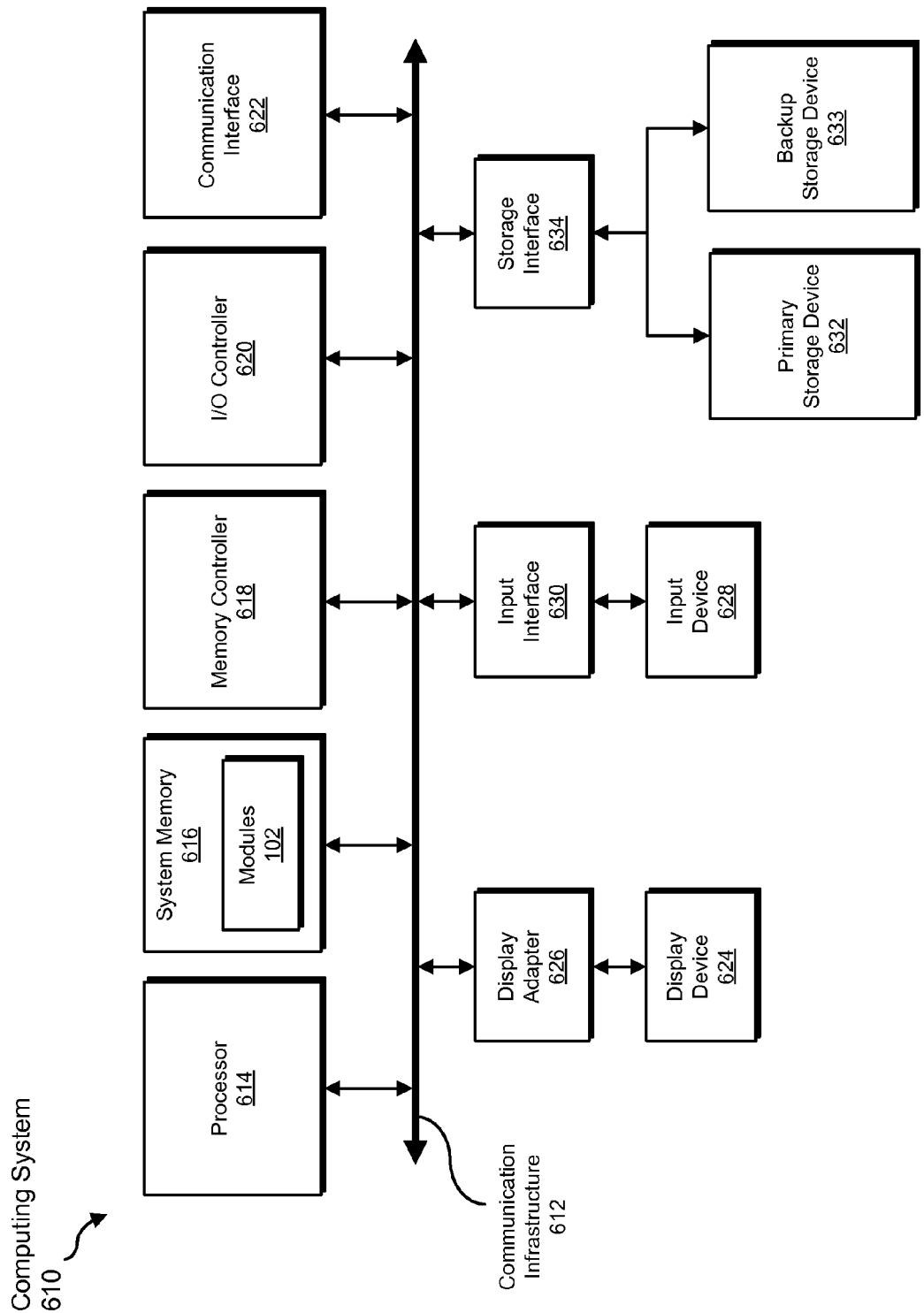
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
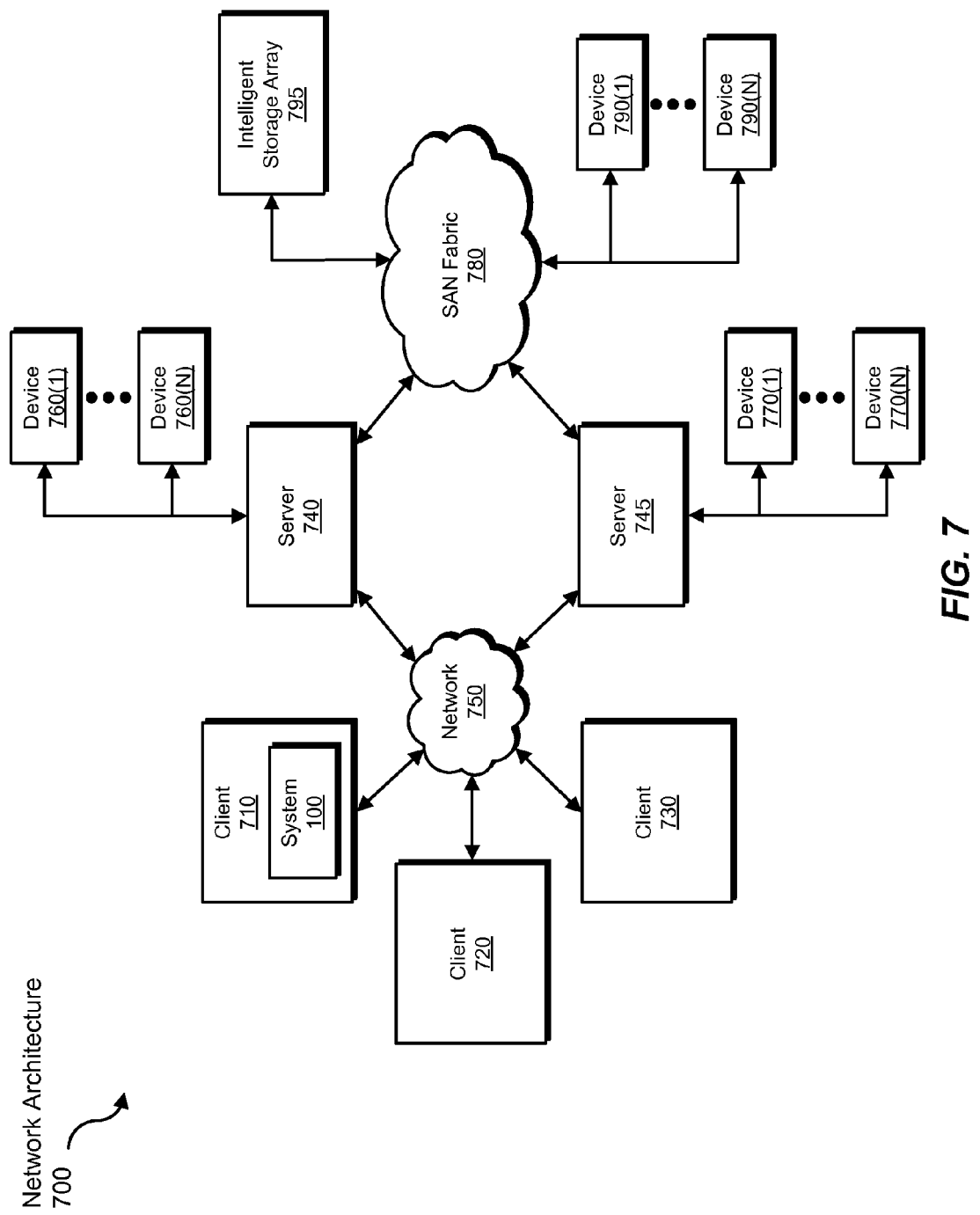
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for verifying the authenticity of graphical images.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive graphical image data to be transformed, transform the graphical image data into a hash, output a result of the transformation to be encoded into the graphical image data, use the result of the transformation to verify and/or discredit the authenticity of the graphical image data, and store the result of the transformation for future use and/or reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for verifying the authenticity of graphical images, at least a portion of the method being performed by a computing device comprising at least one processor, the method comprising:
   identifying a graphical image intended for presentation by a display;
   prior to facilitating presentation of the graphical image by the display:
      identifying an original unique identifier of at least a portion of the graphical image that has been steganographically encoded into one or more least significant bits of one or more pixels included in the graphical image;
      computing a subsequent unique identifier of the portion of the graphical image; and
      determining, by comparing the subsequent unique identifier to the original unique identifier, whether the graphical image is authentic.

2. The method of claim 1, further comprising:
   identifying the graphical image at a source device that generated the graphical image;

computing, at the source device, the original unique identifier of the portion of the graphical image; and modifying the graphical image by encoding the original unique identifier into the graphical image.

3. The method of claim 2, wherein the graphical image comprises at least one of:
    a photographic image captured by a camera associated with the source device; and
    a computer-generated image created by the source device.

4. The method of claim 2, wherein computing the original unique identifier of the portion of the graphical image comprises cryptographically signing, at the source device, the original unique identifier with a private key.

5. The method of claim 4, wherein modifying the graphical image by encoding the original unique identifier into the graphical image comprises encoding, at the source device, a signed version of the original unique identifier as a set of pixels included in the graphical image.

6. The method of claim 4, wherein modifying the graphical image by encoding the original unique identifier into the graphical image comprises steganographically encoding, at the source device, a signed version of the original unique identifier into the least significant bits of the pixels included in the graphical image.

7. The method of claim 4, wherein identifying the original unique identifier of the portion of the graphical image encoded into the graphical image comprises decrypting the original unique identifier with a public key that corresponds to the private key.

8. The method of claim 1, wherein determining whether the graphical image is authentic comprises determining that the graphical image is authentic; and
    further comprising, in response to determining that the graphical image is authentic, enabling the display to present the graphical image by delivering the graphical image to the display for presentation.

9. The method of claim 1, wherein determining whether the graphical image is authentic comprises determining that the graphical image is inauthentic; and
    further comprising, in response to determining that the graphical image is inauthentic, preventing the display from presenting the graphical image by refusing to deliver the graphical image to the display.

10. The method of claim 1, wherein determining whether the graphical image is authentic comprises determining that the graphical image is inauthentic; and
    further comprising determining, based at least in part on the determination that the graphical image is inauthentic, that a user device associated with the display is infected with malware.

11. The method of claim 10, wherein determining that the user device associated with the display is infected with malware comprises at least one of:
    identifying the malware on the user device;
    notifying the user device of the malware; and
    notifying security software that monitors the user device of the malware.

12. The method of claim 1, wherein the original unique identifier and the subsequent unique identifier each comprise at least one of:
    a hash; and
    a fingerprint.

13. The method of claim 1, wherein the identifying, computing, and determining features are performed by a graphics-mediation device that:
    resides between a user device and the display; and
    mediates graphical images delivered for presentation by the display.

14. A system for verifying the authenticity of graphical images, the system comprising:
    an identification module, stored in memory, that:
        identifies a graphical image intended for presentation by a display; and
        identifies an original unique identifier of at least a portion of the graphical image that has been steganographically encoded into one or more least significant bits of one or more pixels included in the graphical image;
    a computation module, stored in memory, that computes a subsequent unique identifier of the portion of the graphical image;
    an authentication module, stored in memory, that determines, by comparing the subsequent unique identifier to the original unique identifier, whether the graphical image is authentic before the display presents the graphical image; and
    at least one physical processor configured to execute the identification module, the computation module, and the authentication module.

15. The system of claim 14, further comprising:
    another instance of the identification module, stored in memory, that identifies the graphical image at a source device that generated the graphical image;
    another instance of the computation module, stored in memory, that computes the original unique identifier of the portion of the graphical image at the source device;
    an encoding module, stored in memory, that modifies the graphical image by encoding the original unique identifier into the graphical image at the source device; and
    at least one physical processor configured to execute the other instance of the identification module, the other instance of the computation module, and the encoding module at the source device.

16. The system of claim 15, wherein the graphical image comprises at least one of:
    a photographic image captured by a camera associated with the source device; and
    a computer-generated image created by the source device.

17. The system of claim 15, further comprising an encryption module, stored in memory, that cryptographically signs, at the source device, the original unique identifier with a private key; and
    wherein the physical processor is further configured to execute the encryption module.

18. The system of claim 17, wherein the encoding module encodes, at the source device, a signed version of the original unique identifier as a set of pixels included in the graphical image.

19. The system of claim 17, wherein the encoding module steganographically encodes, at the source device, a signed version of the original unique identifier into the least significant bits of the pixels included in the graphical image.

20. A non-transitory computer-readable medium comprising one or more computer-executable instructions that, when executed by at least one processor of a computing device, cause the computing device to:
    identify a graphical image intended for presentation by a display;
    prior to facilitating presentation of the graphical image by the display:
        identify an original unique identifier of at least a portion of the graphical image that has been steganographically encoded into one or more least significant bits of one or more pixels included in the graphical image;
compute a subsequent unique identifier of the portion of the graphical image; and
determine, by comparing the subsequent unique identifier to the original unique identifier, whether the graphical image is authentic.

* * * * *